(12) United States Patent
West et al.

(10) Patent No.: US 8,881,924 B2
(45) Date of Patent: Nov. 11, 2014

(54) TANKS FOR CONTAINING A FLUID WITHIN A CHAMBER

(75) Inventors: Colin John West, Bristol (GB); James Alves, Bristol (GB); Robert Piper, Bristol (GB)

(73) Assignee: Airbus Operations Limited, Bristol (GB)

( * ) Notice: Subject to any disclaimer, the term of this patent is extended or adjusted under 35 U.S.C. 154(b) by 691 days.

(21) Appl. No.: 12/761,938

(22) Filed: Apr. 16, 2010

(65) Prior Publication Data

US 2010/0200700 A1 Aug. 12, 2010

Related U.S. Application Data

(63) Continuation-in-part of application No. PCT/GB2008/050942, filed on Oct. 16, 2008.

(30) Foreign Application Priority Data

Oct. 19, 2007 (GB) .................................. 0720406.8

(51) Int. Cl.
| | |
|---|---|
| *B65D 6/10* | (2006.01) |
| *B65D 6/34* | (2006.01) |
| *B65D 88/12* | (2006.01) |
| *B65D 8/08* | (2006.01) |
| *B64D 37/02* | (2006.01) |
| *B64D 37/12* | (2006.01) |
| *B64D 37/08* | (2006.01) |
| *F16B 5/02* | (2006.01) |
| *B60K 15/03* | (2006.01) |

(52) U.S. Cl.
CPC ................. *B64D 37/08* (2013.01); *B60K 15/03* (2013.01); *B60K 2015/03151* (2013.01); *B60K 2015/03118* (2013.01); *B60K 2015/03144* (2013.01); *F16B 5/02* (2013.01); *Y02T 50/44* (2013.01); *Y10S 220/905* (2013.01)
USPC ......... 220/4.15; 220/4.14; 220/905; 220/562; 220/564; 220/645; 244/135 B; 244/135 R

(58) Field of Classification Search
USPC ....................... 220/4.14, 4.15, 905, 562, 564, 220/651–653, 645, 646; 244/135 B, 135 R
See application file for complete search history.

(56) References Cited

U.S. PATENT DOCUMENTS

| | | | |
|---|---|---|---|
| 3,074,585 A | 1/1963 | Koontz et al. | |
| 3,794,203 A * | 2/1974 | Baumann | ..................... 220/4.14 |

(Continued)

FOREIGN PATENT DOCUMENTS

| | | |
|---|---|---|
| CN | 1798686 A | 7/2006 |
| DE | 3049429 A1 | 7/1982 |

(Continued)

OTHER PUBLICATIONS

Chinese Office Action for Application No. 200880112216.X dated May 9, 2012.

(Continued)

*Primary Examiner* — Fenn Mathew
*Assistant Examiner* — Jennifer Castriotta
(74) *Attorney, Agent, or Firm* — Lowe Hauptman & Ham, LLP

(57) ABSTRACT

A tank for containing a fluid, such as fuel, oil or gas within a chamber. The walls of the chamber are partially defined by a rigid structure having an opening; and partially defined by an elastomeric diaphragm which is attached around its periphery to the rigid structure and covers the opening in the rigid structure. An attachment frame engages the diaphragm and the rigid structure, and extends around the periphery of the diaphragm. The attachment frame has a first portion which engages the diaphragm, and a second portion which is positioned outside an outer edge of the diaphragm and attached to the rigid structure.

19 Claims, 6 Drawing Sheets

(56) References Cited

U.S. PATENT DOCUMENTS

| | | | |
|---|---|---|---|
| 4,036,503 A | | 7/1977 | Golick |
| 4,478,165 A | | 10/1984 | Strain |
| 4,625,980 A | * | 12/1986 | Lyzohub ................. 280/834 |
| 5,011,556 A | * | 4/1991 | Yamaguchi et al. ......... 156/83 |
| 5,217,797 A | * | 6/1993 | Knox et al. ............... 428/167 |
| 5,368,930 A | * | 11/1994 | Samples .................. 428/323 |
| 5,983,945 A | | 11/1999 | Salmon |
| 6,076,769 A | | 6/2000 | Gallegos |
| 6,401,966 B2 | * | 6/2002 | Tsai ....................... 220/723 |
| 2003/0218098 A1 | | 11/2003 | Goto et al. |
| 2006/0243858 A1 | * | 11/2006 | Anghileri ................. 244/118.1 |

FOREIGN PATENT DOCUMENTS

| | | |
|---|---|---|
| DE | 43 13 103 A1 | 10/1994 |
| EP | 0376190 A2 | 7/1990 |
| GB | 555984 A | 9/1943 |
| GB | 569065 A | 5/1945 |
| GB | 801098 A | 9/1958 |
| GB | 1249301 A | 10/1971 |
| JP | 38-23842 | 11/1959 |
| JP | 64-142778 | 11/1981 |
| JP | 4005199 A | 1/1992 |
| JP | 2006207446 A | 8/2006 |
| RU | 2 284 334 C2 | 9/2006 |
| WO | WO 2004106155 A1 | 12/2004 |
| WO | 2006/021812 A1 | 3/2006 |

OTHER PUBLICATIONS

"Aerospace Fluorosilicones", Technical Bulletin, 2006, Parker Hannifin Corp., Cleveland OH, (downloaded from the Internet May 17, 2012).

An English translation of a Russian Office Action, dated May 18, 2012, in connection with PCT/GB2008/050942.

British Search Report for GB072406.8 dated Feb. 1, 2008.

Japanese Office Action for Application No. 2010-529457 mailed Mar. 19, 2013.

* cited by examiner

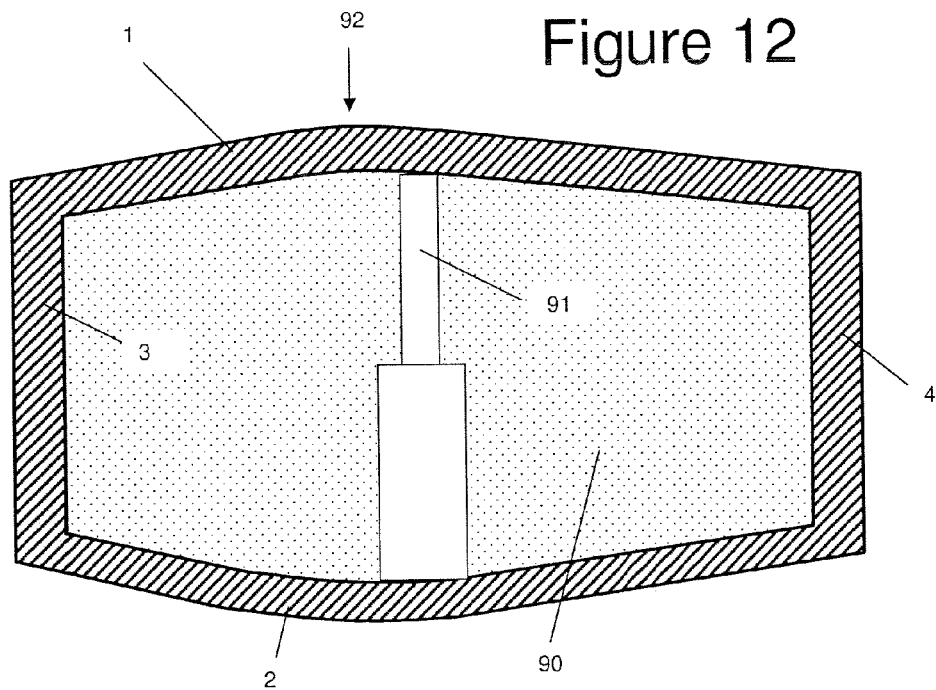
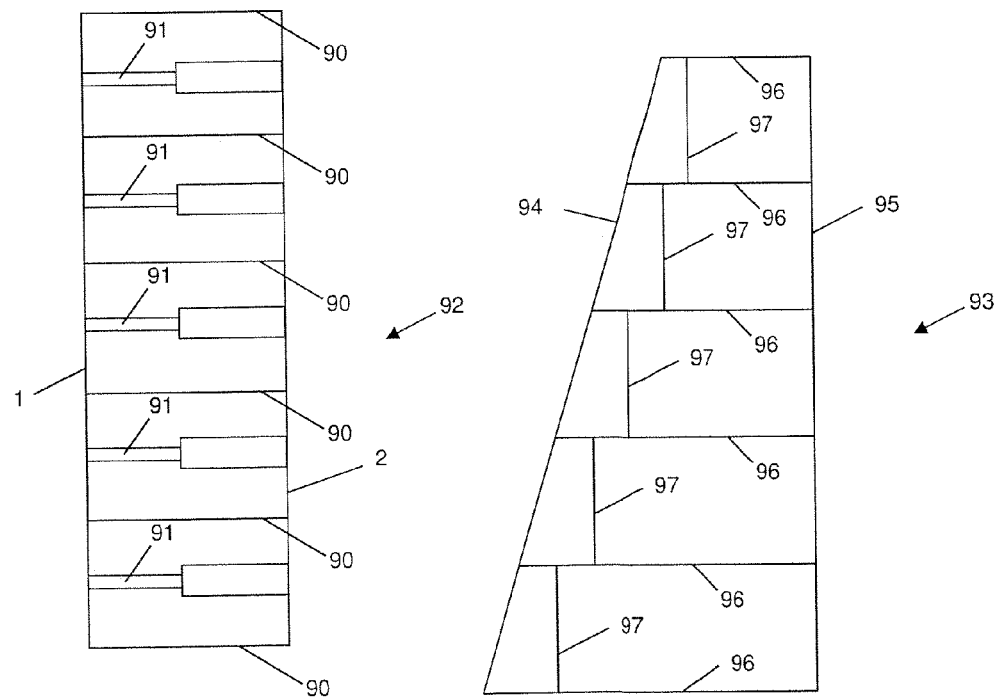
Figure 12
Figure 11
Figure 13

TANKS FOR CONTAINING A FLUID WITHIN A CHAMBER

RELATED APPLICATIONS

The present application is a continuation-in-part of International Application Number PCT/GB2008/050942 filed Oct. 16, 2008, and claims priority from British Application Number 0720406.8 filed Oct. 19, 2007, the disclosures of which are hereby incorporated by reference herein in their entirety.

FIELD OF THE INVENTION

The present invention relates to a tank for containing a fluids such as fuel, oil or gas, within a chamber. The tank is typically, although not exclusively, installed on a vehicle such as an aircraft.

BACKGROUND OF THE INVENTION

Most modern aircraft now use fuel tanks incorporated into the airframe structure and use the wing or fuselage skins, spars and ribs as the boundaries. These boundaries are currently made from rigid structural material such as aluminium alloy or reinforced plastic composite.

U.S. Pat. No. 5,983,945 describes a wing tank liner which limits the amount of fuel that can be spilled in the event of a crash. A neoprene rubber liner is suspended within the fuel tank from a frame or from the tank itself.

It is often necessary to divide up a fuel tank into a number of compartments for aircraft trim, to reduce fuel movements (caused by pitch, roll and yaw) during manoeuvres, and to produce collector cells for the engine fuel feeds. These boundaries are traditionally made from rigid material such as aluminium alloy or of reinforced plastic composites. These traditional materials have a number of advantages such as high tensile strength and stiffness, however their rigidity makes it difficult to remove them for maintenance or tank internal access, particularly within a confined space. They are also relatively dense and thus heavy. For example aluminium alloy typically has a density in the range of 2.85-3.05 $Mgm^{-3}$, and reinforced plastic composite materials typically have a density in the range of 1.65-1.75 $Mgm^{-3}$.

It would be desirable to provide a tank which has a lower weight, easier access for inspection and maintenance purposes, and the ability to withstand pressure pulses.

SUMMARY OF THE INVENTION

A first aspect of the invention provides a tank for containing a fluid within a chamber, wherein the boundaries of the chamber are partially defined by a rigid structure having an opening; and partially defined by an elastomeric diaphragm which is attached around its periphery to the rigid structure and covers the opening.

The rigid structure may have an element of flexibility, but in general will be more rigid than the elastomeric diaphragm. Thus the invention combines the mechanical advantages of a rigid primary structure, with the advantages of an elastomeric diaphragm: namely low density (typically lower than 1.6 $Mgm^{-3}$, and preferably lower than 1.5 $Mgm^{-3}$) and flexibility. The flexibility of the diaphragm enables it to be easily removed for access to the chamber through the hole in the rigid structure, and then bent or rolled-up to enable it to be stored within a confined space. The flexibility of the diaphragm also enables it to transfer loads resulting from pressure pulses into the primary structure more slowly.

In one embodiment the rigid structure has sufficient flexibility to enable a so-called "morphing" function in which one or more actuators is configured to change the shape of at least part of the rigid structure to which the diaphragm is attached.

Typically the material forming the diaphragm comprises a reinforcement element such as fabric, randomly oriented short fibres, or any other type of reinforcement. Such reinforcement enables the diaphragm to easily support both hydraulic/pneumatic loads and structural loadings. The orientation and/or distribution of the reinforcement can be tailored to provide increased stiffness in one or more direction relative to other directions.

The diaphragm may have fluid on one side only, or may define at least part of a dividing wall between two tank chambers—in other words with fluid on both sides.

The diaphragm may be uniformly thick, or may comprise a relatively thick region around its periphery where it is attached to the rigid structure; and a relatively thin central region.

Preferably an attachment frame engages the diaphragm and the rigid structure, and extends around the periphery of the diaphragm. This frame may be bonded or welded to the rigid structure, or more preferably attached to the rigid structure by a plurality of fasteners which are distributed around the periphery of the diaphragm, each fastener passing through the thickness of at least the attachment frame and the rigid structure.

The fastener may pass through the diaphragm. In this case, to avoid tearing adjacent to the fasteners reinforcing material can be provided around the fastener holes. However more preferably the attachment frame has a first portion which engages the diaphragm, and a second portion which is positioned outside an outer edge of the diaphragm and attached to the rigid structure. This provides a more compact solution. Preferably the second portion of the attachment frame comprises a plurality of holes which pass through the thickness of the attachment frame, each hole receiving a respective fastener which attaches the attachment frame to the rigid structure.

The first portion of the attachment frame may engage the diaphragm in a number of ways: for instance it may be encapsulated within the diaphragm, it may engage one or two external faces of the diaphragm, and/or it may be bonded to the diaphragm.

At least one external face of the diaphragm may comprises one or more protrusions and/or indentations which engage the attachment frame. These protrusions/indentations may extend as elongate ridges or channels round the entire periphery of the diaphragm, or may be more limited in length.

In one embodiment described below, the diaphragm is substantially planar and attached to an element of the support structure which lies substantially in the same plane as the diaphragm. However other arrangements are possible, for instance the diaphragm may be non-planar and/or may form a complete wall of the tank.

In the embodiments of the invention described below, the tank is a fuel tank. However the invention may also be used in other types of tank: for instance for containing hydraulic fluids, oils (for instance in aircraft bilge areas) or pressurised gas (for instance aircraft fuselage pressure covers). The diaphragm material must be carefully selected for the application—for instance a hydraulic oil resistant diaphragm could be made from ethylene propylene diene monomer (EPDM) rubber with a glass reinforcement and aluminium attachment frame.

Optionally the tank may further comprise a flexible protection layer which covers the elastomeric diaphragm and protects it against the ingress of corrosive liquid, such as hydraulic oil, which would otherwise corrode the elastomeric material which forms the diaphragm. For instance the flexible protection layer may comprises a curtain which is attached around its periphery to the rigid structure, or a coating which coats the elastomeric diaphragm.

In the embodiments of the invention described below, the tank is an aircraft tank. However the invention may also be used in other types of vehicle such as fuel tanker lorries or ships. Also the tank may be used in non-vehicular applications such as sumps or interceptors in waste water systems.

BRIEF DESCRIPTION OF THE DRAWINGS

Embodiments of the invention will now be described with reference to the accompanying drawings, in which:

FIG. 11 is a first schematic sectional view of a morphing wing-box;
FIG. 12 is a second schematic sectional view of the wing-box of FIG. 11;
FIG. 13 is a schematic plan view of a wing-box with the upper and lower skins removed.

DETAILED DESCRIPTION OF EMBODIMENT(S)

Figure 1:
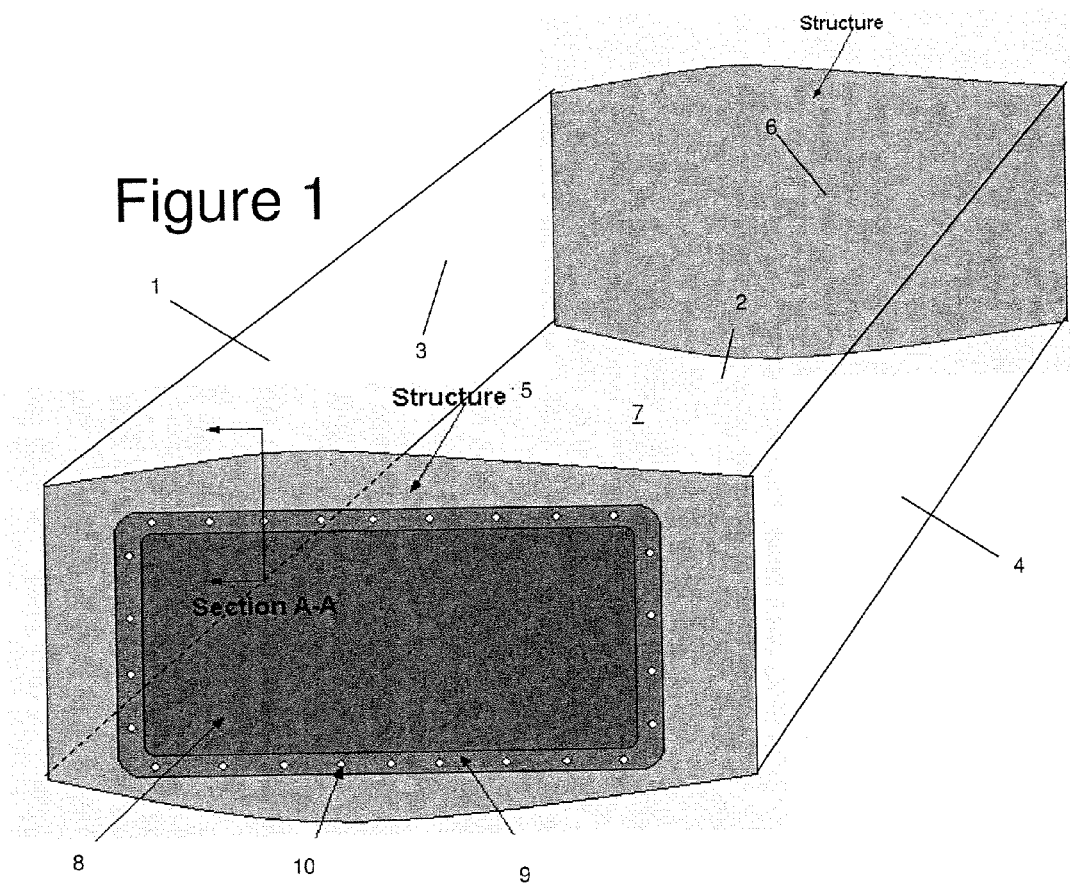
FIG. 1 is an isometric view of a fuel tank.

FIG. 1 shows part of the structure of an aircraft wing box comprising an upper skin 1, lower skin 2, leading edge spar 3, trailing edge spar 4, inboard rib 5 and outboard rib 6. Elements 1-6 define the upper, lower, front, rear and side boundaries of a fuel tank chamber 7. The inboard rib 5 has an opening which is covered by an elastomeric diaphragm 8. The diaphragm 8 is attached and sealed around its periphery to the inboard rib 5 by an aluminium attachment frame 9 with a set of fastener holes 10.

Figure 2:
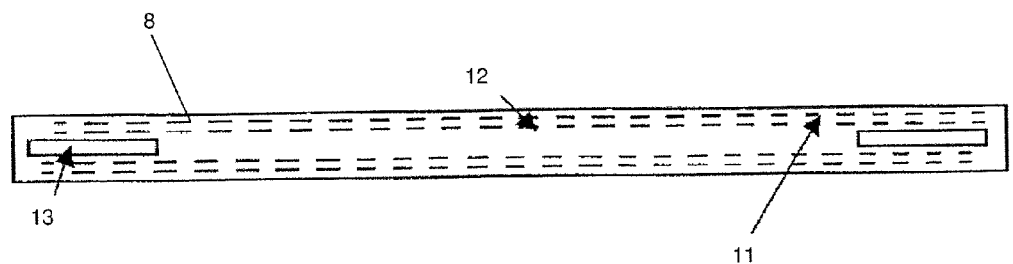
FIG. 2 is a sectional view of the diaphragm.

As shown in FIG. 2, the material forming the diaphragm 8 comprises a reinforcement fabric element 11 (in this case four separate layers of fabric) impregnated with an elastomeric matrix 12. The elastomeric matrix 12 may comprise a fluorosilicone rubber, for example. This is an inert material which will not corrode in fuel and therefore does not require painting or pre-treatment. An internal interleaf 13 of stiff material is bonded within the diaphragm and extends around its periphery.

The diaphragm material typically has a relatively low density between 1.35 Mgm$^{-3}$ and 1.55 Mgm$^{-3}$. Also the material volume of the diaphragm can be lower than traditional materials as external stiffening ribs do not need to be added. These two factors combine to reduce the mass of the fuel tank by a substantial amount.

For example, the elastomer may comprise a fluorosilicone rubber to ABR4-0090A with a density of 1.455 Mgm$^{-3}$, and the fabric may comprise a meta-aramid to ABR9-0142 with an approximate density of 1.465 Mgm$^{-3}$. If the aramid fibres are difficult to vulcanise then other fibre materials such as a polyester or glass may be used.

If access is required into the chamber 7, then the diaphragm can be removed, rolled up and passed out of the confined wing area through a manhole (not shown). Metallic or composite doors have to remain within the wing as they are usually too bulky to pass through the manhole.

Unlike a conventional wing tank liner as described in U.S. Pat. No. 5,983,945, the diaphragm is fastened to the airframe and feeds loads directly into that airframe. It is also capable of transferring loads from one end of the diaphragm to the other as a rigid boundary would. As well as being sufficiently flexible to be removable from the wing, the diaphragm must be stiff enough to resist hydraulic pressure pulses created by high-G manoeuvres of the aircraft. Tests with a 400 mm by 400 mm diaphragm have shown that it is able to fully contain a 53 psi pulse of compressed air with no leakage and a displacement at the centre of the diaphragm of 35 mm.

Figure 3:
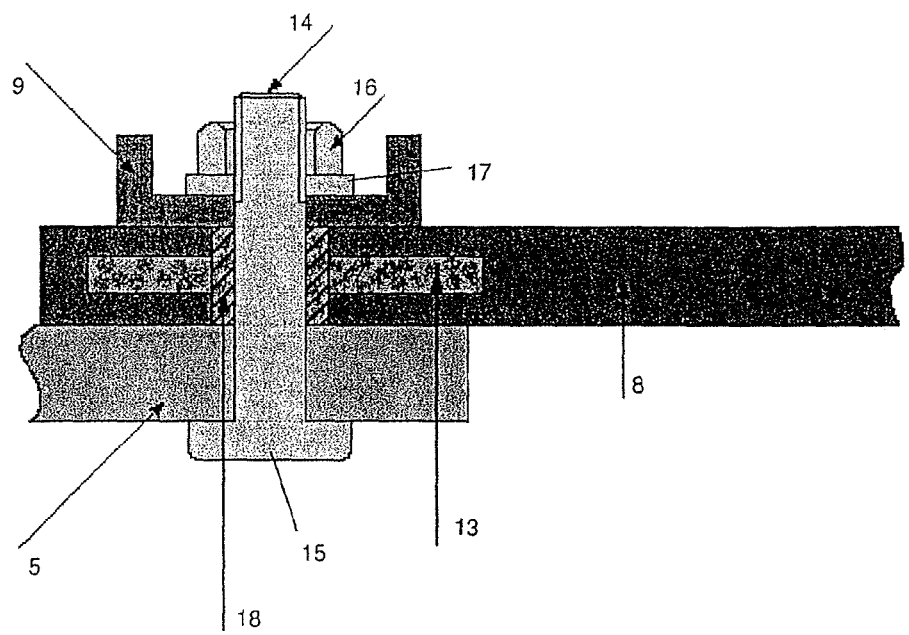
FIG. 3 is a section along line A-A in FIG. 1.

FIG. 3 is a sectional view along a line A-A in FIG. 1. A plurality of fastener bolts are distributed around the periphery of the diaphragm, each fastener passing through the thickness of the attachment frame 9 and the rib 5 as shown in FIG. 3.

Each bolt has a shaft with a threaded distal end 14 which passes through holes in the rib 5, diaphragm 8 and attachment frame 9. The head 15 of the bolt engages the face of the rib 5, and a nut 16 is screwed onto the shaft and bears against a washer 17 which in turn bears against the face of the frame 9.

A compression and corrosion resistant ferrule 18 supports the load of the fastener. If the fastener were tightened directly to the diaphragm 8 then the material would suffer cold creep and this would manifest itself as apparent torque relaxation of the fastener system.

The interleaf 13 reinforces the rubber and fabric diaphragm where it is weakened by the fastener hole. The interleaf 13 also doubles as reinforcement so that it may provide stiffness to resist the bowing force (in the x direction) between the fasteners at a point mid fastener pitch caused by the pressure in the diaphragm being converted into a tension load.

The attachment frame 9 has a channel section as shown in order to provide a strong calming force between the fasteners—at a point mid fastener pitch to oppose the reaction to exerted load (in the y direction) this must exceed the reaction load y to give acceptable sealing.

The assembly method shown in FIG. 3 has a number of disadvantages the most significant of which is that the diaphragm is compromised by the fastener holes and strength is reduced. Secondly the assembly is complex, bulky, massive and therefore costly. Some solutions to these problems are shown in FIGS. 4-7 below.

Figure 4:
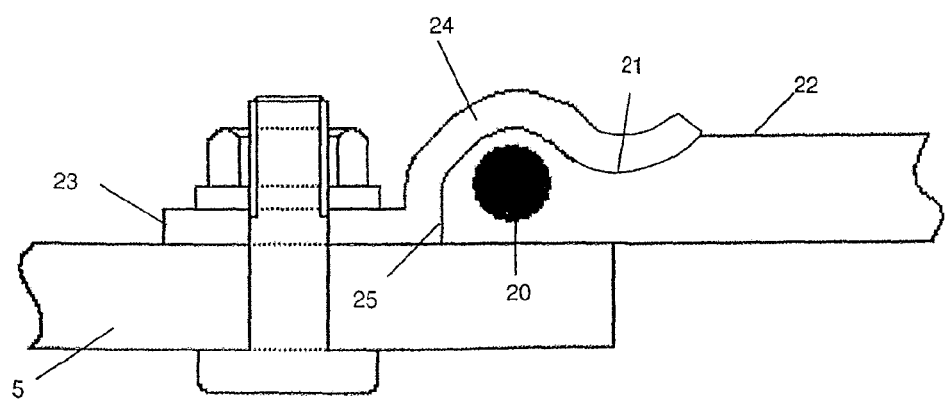
FIGS. 4-7 are sectional views of further clamping arrangements.

In FIG. 4 the flexible diaphragm 8 is manufactured without the interleaf 13. In its place the perimeter of the diaphragm contains a fully encapsulated bonded wire 20. A channel 21 is moulded in an external face 22 of the diaphragm. Note that the wire 20 extends around the full periphery of the diaphragm, and is positioned closer to its outer edge 25 than the channel 21.

An aluminium attachment frame extends around the full periphery of the diaphragm. The attachment frame has a return portion 24 which is received in the channel 21, and a peripheral portion 23 which is positioned outside an outer edge 25 of the diaphragm and attached to the rib 5 by bolts.

The tension load, x, is transferred from the diaphragm into the attachment frame using the bonded wire 20 as an anchor locked in place by the return 24 in the attachment frame. The peripheral position of the portion 23 allows the fastener load to be transferred directly into the rib 5 removing the need for the ferrule 18. The modified section of the wire 20 still has to provide a strong calming force between the fasteners—at a point mid fastener pitch to oppose the reaction to exerted load (in the y direction) this must exceed the reaction load y to give acceptable sealing.

Note that the clamping arrangement shown in FIG. 4 enables the diaphragm to act as a bursting disk. That is, a large spanwise fuel pressure pulse will cause the clamping arrangement to fail and release the diaphragm, diverting load away from the upper and lower skins and reducing the likelihood of rupture in the upper and lower skins.

Figure 5:
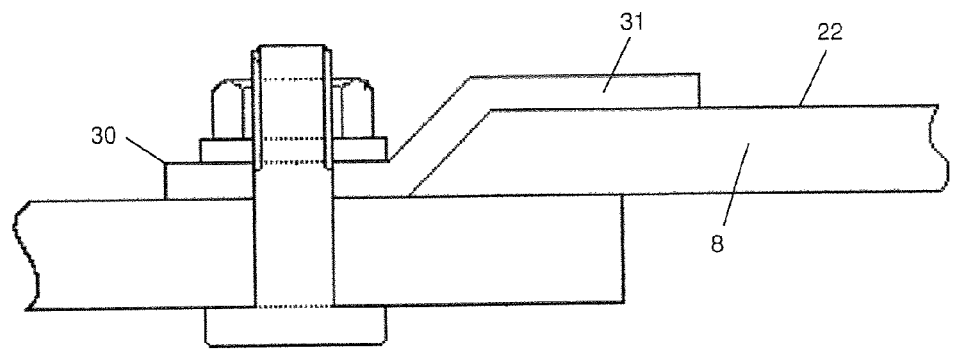

In FIG. 5 the diaphragm 8 has no bonded interleaf or wire and the assembly is reduced to its most simple form. The attachment frame 30 has an arm 31 bonded directly to the external face 22 of the diaphragm 8 and the frame is then able to supply all the support in both the x and y directions. This is because the bonding limits the movement of the diaphragm 8 relative to the frame 30 and results in a stiffer assembly. FIG. 5 is the lowest mass and most compact solution and probably the lowest cost option.

Figure 6:
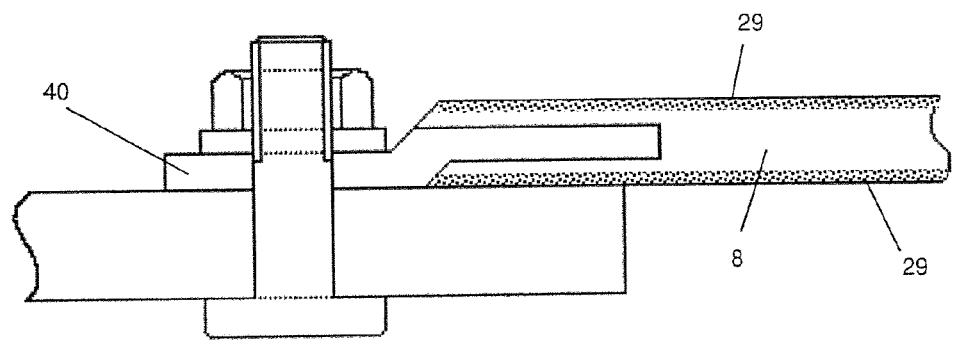

FIG. 6 presents an alternative option for a bonded diaphragm clamp where the attachment frame 40 is bonded and encapsulated within the diaphragm 8. This gives higher bond strength than the FIG. 5 solution and would be suitable where higher loads are anticipated.

Figure 7:
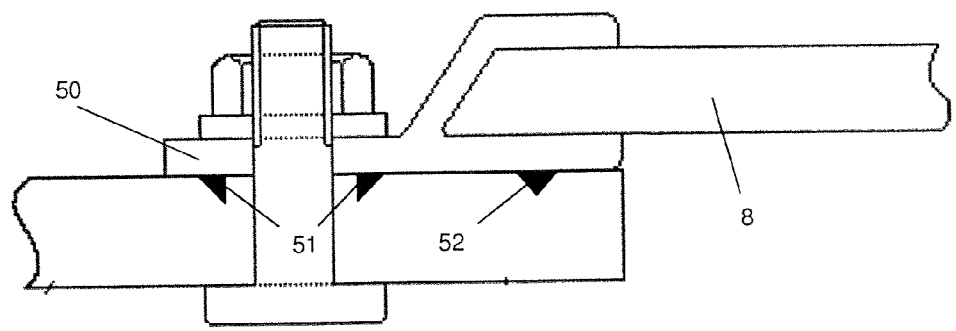

FIG. 7 presents a further alternative option for a bonded diaphragm clamp where the attachment frame 50 engages both external faces of the diaphragm 8. This provides a higher bonding strength than the solution of FIG. 5, and also encloses the bonded area so that it has a greater resistance to mechanical damage. Elastomeric seals 51, 52 provide a fluid-tight seal between the frame 50 and the rib.

Figure 8:
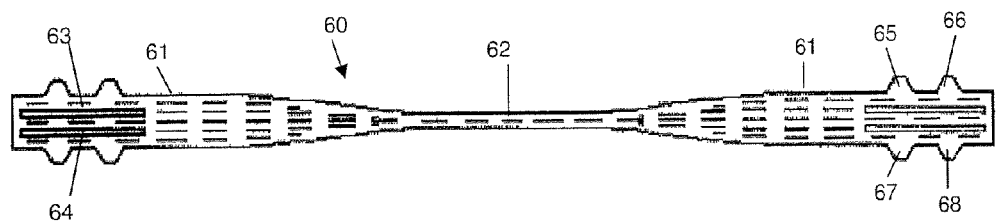
FIG. 8 is a sectional view of a diaphragm with a thinned central region.

FIG. 8 is a sectional view of an alternative diaphragm 60. The material forming the diaphragm 60 comprises various layers of fabric impregnated with an elastomeric matrix. The elastomeric matrix may comprise a fluorosilicone rubber, for example.

The diaphragm 60 comprises a relatively thick region 61 around its periphery where it is attached to the rib; and a relatively thin central region 62 which reduces weight and material volume. The central region 62 has only one or two layers of fabric and a thickness of approximately 0.8-1.5 mm, and the outer region 61 has four layers. Two internal interleafs 63, 64 of stiff material are bonded within the diaphragm and extend around the outer region 61. The central fabric layer passes between these two interleafs. The two external faces of the outer region 61 carry moulded protrusions 65-68 which engage with an attachment frame (not shown) and fully seal against fuel leakage.

Figure 9:
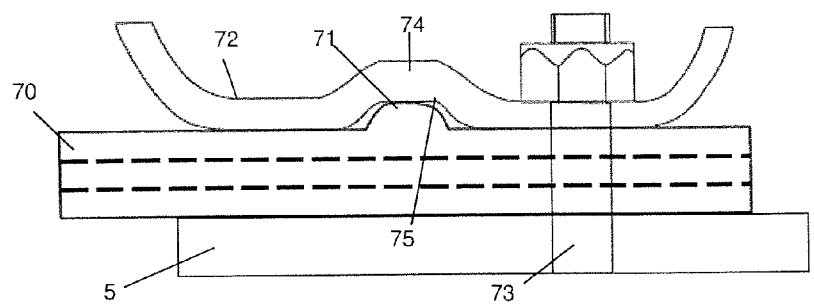
FIGS. 9 and 10 are sectional views of further clamping arrangements.

FIG. 9 is a sectional view of an alternative diaphragm 70 and clamping assembly. The diaphragm 70 is similar to the diaphragm 60 but in this case has only one protrusion 71 on its upper surface. FIG. 9 shows only the outer region of the diaphragm 70. The centre of the diaphragm may be thinned in a similar manner to the diaphragm 60.

An attachment frame 72 clamps the diaphragm 70 to the rib 5. A fastener shaft 73 passes through the frame 72, diaphragm 70 and rib 5. The frame 72 has a bent section 74 defining a channel 75 which receives the protrusion 71.

Figure 10:
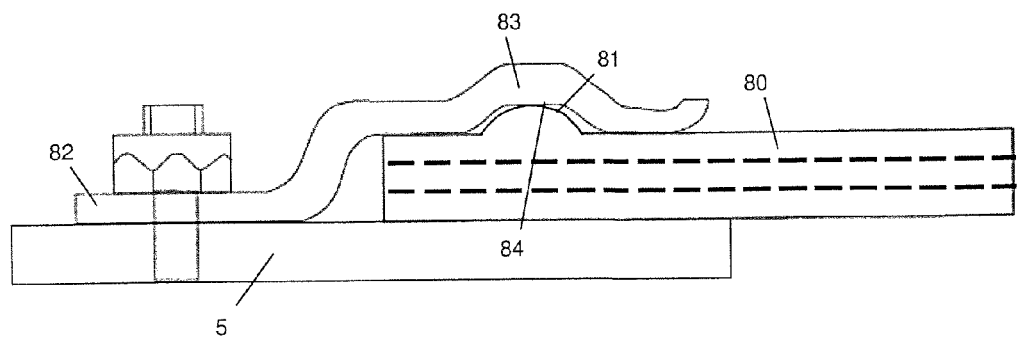

FIG. 10 is a sectional view of a further alternative diaphragm 80 and clamping assembly. The diaphragm 80 is similar to the diaphragm 70 and has a protrusion 81 on its upper surface. An attachment frame clamps the diaphragm 80 to the rib 5. The attachment frame has an outer portion 82 which is fastened to the rib 5, and an inner portion with a bent section 83 defining a channel 84 which receives the protrusion 81.

The most significant advantage of the designs of FIGS. 4-7 and 10, compared with the designs of FIGS. 3 and 9, is that the diaphragm is not compromised by the introduction of fastener holes. As a result these designs are inherently stronger. Also, as there is no need to add extra stiffening around these holes to resist tearing of the rubber and fabric, further mass is saved. Also the diaphragm does not have to extend peripherally beyond the fasteners, and as a result the diaphragm can be smaller in the y-direction and therefore lighter. Also because the shafts of the fasteners do not pass through the diaphragm they can be shorter, saving further mass. Finally, the assembly takes up less space in the y-direction.

In the embodiments described above, the diaphragm is attached to a planar rib 5 which lies substantially in the same plane as the diaphragm. However other arrangements are possible, for instance the diaphragm may completely replace the rib 5, and be attached around its periphery by flanges to the spars 3,4 and skins 2,3.

An example of such an alternative arrangement is shown in FIGS. 11 and 12. A wing-box 92 comprises an upper skin 1, lower skin 2, leading edge spar 3, and trailing edge spar 4. The ribs of a conventional wing-box are replaced by elastomeric diaphragms 90, similar to the diaphragm 8 shown in FIG. 1. Each diaphragm 90 is connected at its periphery to the covers 1,2 and the spars 3,4, using an attachment arrangement similar to one of the arrangements shown in FIGS. 4-10. Elements 1-4 and 90 define the boundaries of five fuel tank chambers.

Hydraulic rams 91 act between the upper and lower skins 1,2, and can be expanded and contracted in order to provide a so-called "morphing" wing structure. Note that only one ram is shown in each chamber but in practice a larger number of such rams may be provided. The elastomeric diaphragms 90 can flex to accommodate the flexing of the upper and lower skins, as well as being sufficiently strong to contain span-wise fuel pressure pulses.

The fabric reinforcement in the diaphragms 90 can be tailored to provide increased stiffness in one or more direction. For instance the diaphragm can be made flexible in the Z-direction between the skins 1,2, but stiffer in the other two orthogonal X and Y directions.

A further alternative arrangement is shown in FIG. 13. A wing-box 93 comprises upper and lower skins (not shown) a leading edge spar 94, a trailing edge spar 95 and a series of six rigid ribs 96. Elastomeric diaphragms 97, similar to the diaphragms 8, 90, run in a spanwise direction. Each diaphragm 97 is connected at its periphery to the skins (not shown) and an adjacent pair of ribs 96, using an attachment arrangement similar to one of the arrangements shown in FIGS. 4-10. Elements 94-97 and the upper and lower skins (not shown) define the boundaries of ten fuel tank chambers. The diaphragms 97 protect the front spar 94 from the chordwise fuel pressure pulse resulting from a crash of the aircraft.

In the embodiments of the invention described above, the tank is a fuel tank and the material forming the diaphragm 8 is chosen for its resistance to corrosion by fuel (fluorosilicone rubber being a suitable choice). However a problem with the use of fuel resistant elastomers is that they tend not to be resistant to other corrosive liquids, in particular hydraulic liquids such as Skydrol™. In the normal course of events the diaphragm 8 is not in contact with hydraulic liquids, but in the event of a failure of the hydraulic system such contact may occur, typically in the form of a spray of hydraulic liquid. Therefore various types of flexible protection layer may be provided to cover the elastomeric diaphragm and protect it against the ingress of corrosive liquids.

One example is shown for illustrative purposes in FIG. 6. In this case the two external faces of the fluorosilicone diaphragm 8 are each coated by vapour deposition with a layer 29 of a non-porous non-elastomeric corrosion resistant material such as paralene. Note that such coating 29 may be provided on one or both sides of the diaphragm 8, and may be applied to the elastomeric diaphragm of any of the embodiments above, not just the embodiment of FIG. 6.

Figure 14:
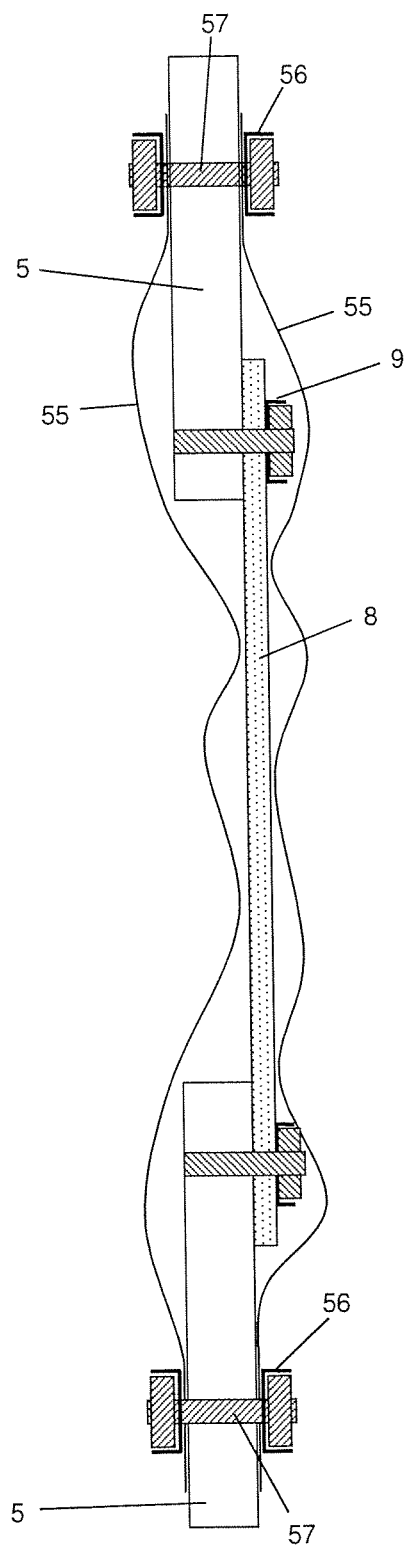
FIG. 14 is a sectional view of a diaphragm with a pair of curtains.

A second type of flexible protection layer is shown in FIG. 14. The rib 5 and fluorosilicone diaphragm 8 are assembled together in a similar manner to the embodiments described above. The diaphragm 8 is attached and sealed around its periphery to the rib 5 by an aluminium attachment frame 9. A pair of curtains 55 are attached around the periphery of the hole in the rib 5. Each curtain 55 is attached and sealed around its periphery to the rib 5 in a similar manner to the diaphragm 8, that is with an aluminium attachment frame 56 and a series of fasteners 57. Note that each curtain 55 is wrinkled so that it can accommodate flexing of the diaphragm 8.

The curtains 55 are non-porous membranes and are formed from a non-elastomeric polymer such as polytetrafluoroethylene (PTFE) which is resistant to corrosion from both fuel and Skydrol™. Note that such curtains 55 may be provided on one or both sides of the diaphragm 8, and may be applied to the elastomeric diaphragm of any of the embodiments above, not just the embodiment of FIG. 14.

Instead of being clamped against the rib 5 by an aluminium attachment frame 56 and a series of fasteners 57 as shown in FIG. 14, the curtains 55 may be directly bonded to the rib 5. Furthermore, although FIG. 14 shows an attachment arrangement in which the curtains 55 form a liquid-tight seal with the rib 5, this is not essential. That is, the curtains 55 may be attached around their periphery to the rib 5 without forming a liquid-tight seal.

Although the invention has been described above with reference to one or more preferred embodiments, it will be appreciated that various changes or modifications may be made without departing from the scope of the invention as defined in the appended claims.

The invention claimed is:

1. A vehicle, comprising: a tank supplying a fluid for use by said vehicle, said tank containing said fluid within a chamber, wherein the boundaries of the chamber are partially defined by a rigid structure having an opening, and partially defined by an elastomeric diaphragm which is attached around its periphery to the rigid structure and covers the opening, wherein the elastomeric diaphragm comprises a reinforcement element impregnated with an elastomeric matrix, and a flexible protection layer inside the fuel tank which covers the elastomeric diaphragm and protects it against the ingress of corrosive liquid.

2. The vehicle of claim 1, wherein the vehicle is an aircraft.

3. The vehicle of claim 1 wherein the tank is a fuel tank.

4. The vehicle of claim 1, wherein the flexible protection layer comprises a curtain on each side of the elastomeric diaphragm, wherein the curtain is attached around its periphery to the rigid structure.

5. The vehicle of claim 1 wherein the flexible protection layer comprises a coating which coats the elastomeric diaphragm.

6. The vehicle of claim 1 wherein the diaphragm comprises a fluorosilicone rubber.

7. The vehicle of claim 1 wherein the diaphragm defines at least part of a dividing wall between two tank chambers.

8. The vehicle of claim 1 wherein the diaphragm comprises a relatively thick region around its periphery where it is attached to the rigid structure; and a relatively thin central region.

9. The vehicle of claim 1 further comprising an attachment frame which engages the diaphragm and the rigid structure, and extends around the periphery of the diaphragm.

10. The vehicle of claim 9 further comprising a plurality of fasteners which are distributed around the periphery of the diaphragm, each fastener passing through the thickness of at least the attachment frame and the rigid structure.

11. The vehicle of claim 9 wherein the attachment frame has a first portion which engages the diaphragm, and a second portion which is positioned outside an outer edge of the diaphragm and attached to the rigid structure.

12. The vehicle of claim 11 wherein the second portion of the attachment frame comprises a plurality of holes which pass through the thickness of the attachment frame, each hole receiving a respective fastener which attaches the attachment frame to the rigid structure.

13. The vehicle of claim 9 wherein the attachment frame engages one or two external faces of the diaphragm.

14. The vehicle of claim 11 wherein the first portion of the attachment frame engages one or two external faces of the diaphragm.

15. The vehicle of claim 9, wherein the attachment frame is bonded to the diaphragm.

16. The vehicle of claim 9, wherein at least one external face of the diaphragm comprises one or more protrusions and/or indentations which engage the attachment frame.

17. The vehicle of claim 16 wherein the diaphragm comprises at least one indentation which engages the attachment frame; and a reinforcement element which is encapsulated within the diaphragm, extends around the periphery of the diaphragm, and is positioned closer to an outer edge of the diaphragm than the indentation(s).

18. A vehicle, comprising: a tank for containing a fluid within a chamber, wherein the boundaries of the chamber are partially defined by a rigid structure having an opening, and partially defined by an elastomeric diaphragm which is attached around its periphery to the rigid structure and covers the opening, an attachment frame which engages the diaphragm and the rigid structure, and extends around the periphery of the diaphragm, wherein the attachment frame has a first portion which engages the diaphragm, and a second portion which is positioned outside an outer edge of the diaphragm and attached to the rigid structure, and wherein the first portion of the attachment frame is encapsulated within the diaphragm.

19. A vehicle, comprising: a tank for containing a fluid within a chamber, wherein the boundaries of the chamber are partially defined by a rigid structure having an opening, partially defined by an elastomeric diaphragm which is attached around its periphery to the rigid structure and covers the opening, and one or more actuators configured to change the shape of at least part of the rigid structure to which the diaphragm is attached.

* * * * *